(12) United States Patent
Saito et al.

(10) Patent No.: US 6,775,085 B2
(45) Date of Patent: Aug. 10, 2004

(54) APPARATUS FOR RECORDING AND REPRODUCING INFORMATION AND INFORMATION REPRODUCING METHOD

(75) Inventors: Masaaki Saito, Fukuroi (JP); Masayoshi Murayama, Fukuroi (JP); Hiroshi Kida, Fukuroi (JP); Tsutomu Ohtani, Fukuroi (JP); Ichiro Miyake, Tokorozawa (JP); Tsutomu Takahashi, Tokorozawa (JP); Kenichiro Tada, Tokorozawa (JP); Yasuyuki Noda, Tokorozawa (JP); Gaku Yamamura, Tokorozawa (JP); Kazutomo Watanabe, Tokorozawa (JP)

(73) Assignee: Pioneer Display Products Corporation, Shizuoka (JP)

( * ) Notice: Subject to any disclaimer, the term of this patent is extended or adjusted under 35 U.S.C. 154(b) by 259 days.

(21) Appl. No.: 10/024,602

(22) Filed: Dec. 21, 2001

(65) Prior Publication Data

US 2002/0109930 A1 Aug. 15, 2002

(30) Foreign Application Priority Data

Dec. 27, 2000 (JP) ........................................ 2000-397599

(51) Int. Cl.$^7$ .............................................. G11B 19/02
(52) U.S. Cl. ....................................................... 360/69
(58) Field of Search .......................................... 360/69

(56) References Cited

U.S. PATENT DOCUMENTS 6,642,939 B1 * 11/2003 Vallone et al. .............. 345/721

* cited by examiner

Primary Examiner—David Hudspeth
Assistant Examiner—Mitchell Slavitt
(74) Attorney, Agent, or Firm—Morgan, Lewis & Bockius LLP

(57) ABSTRACT

Disclosed is an apparatus for recording and reproducing information and an information reproducing method in which the reproducing operation can be restarted from a position where reproduction was interrupted. The restart is possible for all of information contents recorded on a recording medium and without the need of troublesome operations. For this purpose, reproduction history information representing a reproduction history of each of the information contents recorded on the recording medium is stored in a management memory.

22 Claims, 8 Drawing Sheets

FIG. 3

| | ID | TITLE | RECORDING AREA ADDRESS $AD_E$ | MEMORY STOP ADDRESS $AD_{MS}$ | REPRODUCTION HISTORY FLAG $F_{RP}$ | DELETION FLAG $F_{DL}$ |
|---|---|---|---|---|---|---|
| RING BUFFER AREA | ???? | NEWS AT 7:00 | 00000~00123, 01111~02000, 05000~05900 | 01500 | 2 | 0 |
| | &&&& | NEWS AT 9:00 | 10000~10222 | | 1 | 0 |
| | #### | FROM VEHICLE WINDOW | 20000~27123, 15111~16000 | 23000 | 2 | 0 |
| | --- | | | | | |
| | ##&# | WEATHER OF TOMORROW | 90000~90022 | | 0 | 0 |
| MEMORY AREA | !#&# | LIVE BROADCAST OF BASEBALL MATCH | 92500~94000 | 93000 | 2 | 1 |
| | ?!&# | LIVE BROADCAST OF SOCCER MATCH | 89000~90000 | | 1 | 0 |

$F_{RP} \begin{cases} 0 : \text{NOT-YET REPRODUCED} \\ 1 : \text{REPRODUCED} \\ 2 : \text{HALFWAY REPRODUCTION} \end{cases}$ $F_{DL} \begin{cases} 0 : \text{NOT-DELETED} \\ 1 : \text{DELETED} \end{cases}$

FIG. 5

| TITLE | REPRODUCTION HISTORY | DELETING STATE | RECORDING AREA SEGMENT |
|---|---|---|---|
| NEWS AT 7:00 | HALFWAY REPRODUCTION | — | RING |
| NEWS AT 9:00 | REPRODUCED | — | RING |
| FROM VEHICLE WINDOW | HALFWAY REPRODUCTION | — | RING |
| LIVE BROADCAST OF BASEBALL MATCH | HALFWAY REPRODUCTION | DELETE | STORE |
| LIVE BROADCAST OF SOCCER MATCH | REPRODUCED | — | STORE |

FIG. 8

(1) REPRODUCE FROM THE INTERRUPTED POSITION UPON NEXT REPRODUCTION (2) REPRODUCE FROM THE HEAD POSITION UPON NEXT REPRODUCTION (3) DELETE THE PROGRAM

APPARATUS FOR RECORDING AND REPRODUCING INFORMATION AND INFORMATION REPRODUCING METHOD

BACKGROUND OF THE INVENTION

1. Field of the Invention

The present invention relates to an apparatus for recording and reproducing information and an information reproducing method for reproducing information contents recorded on a recording medium.

2. Description of Related Art

A video tape recorder, a DVD recorder, a hard disk recorder, or the like are examples of known apparatuses for recording and reproducing information contents such as movies and television programs onto/from a recording medium. A videotape, an optical disk, and a magnetic disk are examples of the recording medium. Recording is performed for example in such a way that the user records a plurality of programs each of which is broadcast by the television system onto one recording medium by using the apparatus for recording and reproducing information. Those apparatuses for recording and reproducing information are therefore provided with the so called the head finding function so that the start position of each program on the recording medium is automatically found out and the reproduction is started from the found position. The head finding operation, however, is merely an operation for searching for the start position of each program, and is not sufficient to respond to user's various demands.

For instance, after having interrupted the reproduction of a certain program A to start the reproduction of another program B, the user may want to watch the former program A once again from the position where the reproduction was interrupted. In such a case, he or she will have to perform the fast the forward or rewinding operation while monitoring the screen in order to find out the position of interruption in the program A.

OBJECTS AND SUMMARY OF THE INVENTION

The invention has been made to solve the problem and it is an object of the invention to provide an apparatus for recording and reproducing information and an information reproducing method, in which the reproducing operation can be restarted without the need of troublesome operations from a position where reproduction was interrupted, for all information contents recorded on the recording medium.

According to the invention, there is provided an apparatus for recording and reproducing information which can record a plurality of information contents onto a recording medium and reproduce the recorded information contents, the apparatus comprising: a reproduction history information generating part for generating reproduction history information representing a reproduction history of the information content recorded on the recording medium; and a management memory for storing the reproduction history information in correspondence to each of the information contents.

According to the invention, there is provided an information reproducing method for reproducing desired information content from a recording medium on which a plurality of information contents have been recorded, the method comprising: a reproduction history information generating step of generating reproduction history information representing a reproduction history for each of the information contents recorded on the recording medium; and a reproduction control step of performing a reproduction control of the information content based on the reproduction history information.

BRIEF DESCRIPTION OF THE DRAWINGS

FIG. 3 is a diagram showing an example of contents management information stored in a recording contents management memory 30;

FIG. 5 is a diagram showing an example of a management table image;

FIG. 8 is a diagram showing an example of a program reproduction optional menu displayed on a screen of a display device 200.

DETAILED DESCRIPTION OF THE PREFERRED EMBODIMENT

An embodiment of the invention will be described in detail hereinbelow with reference to the drawings.

Figure 1:
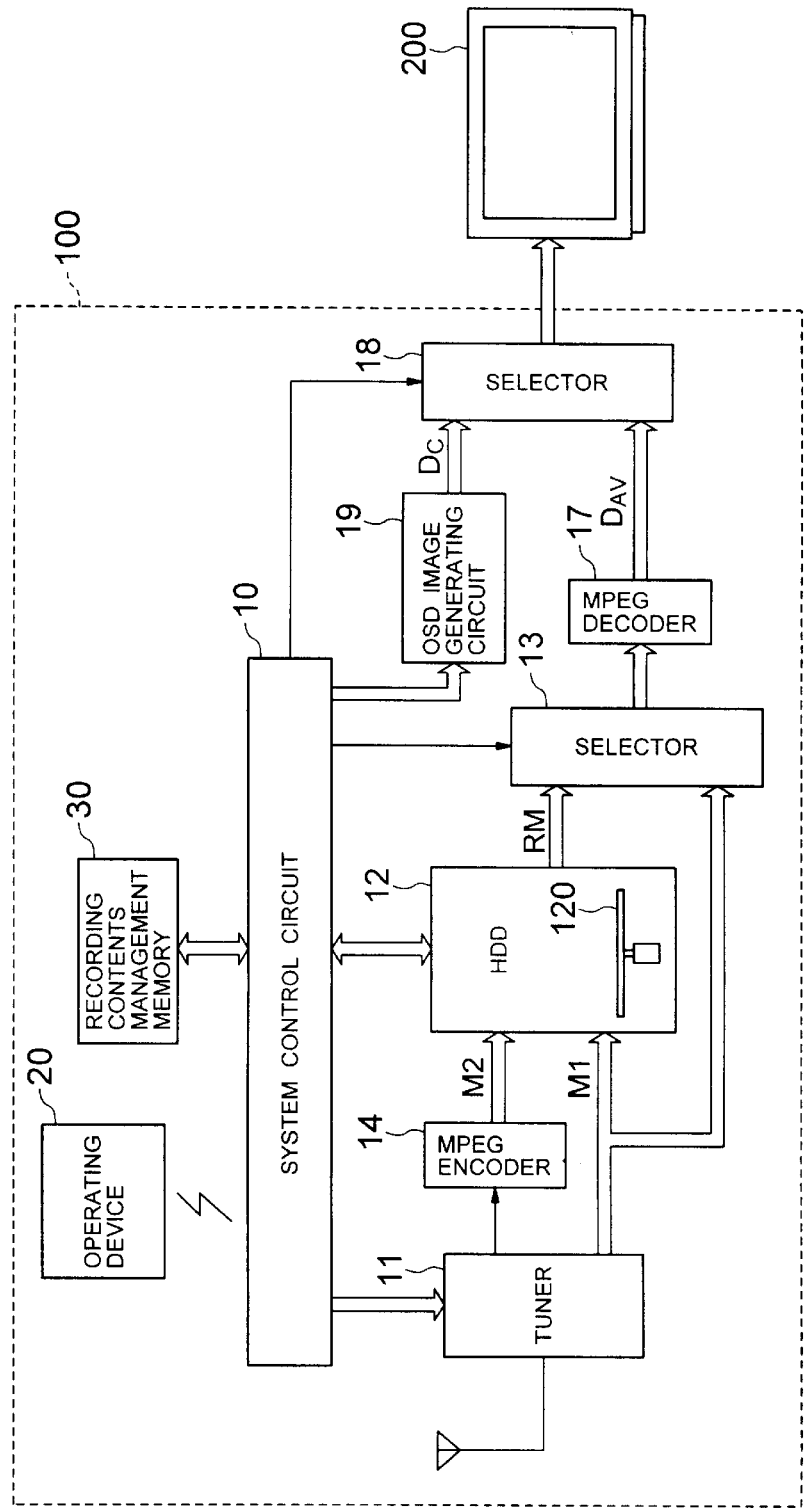
FIG. 1 is a diagram showing an internal construction of a hard disk recorder 100 as an apparatus for recording and reproducing information according to the invention.

FIG. 1 is a diagram showing an internal construction of a hard disk recorder 100 as an apparatus for recording and reproducing information according to the invention.

In FIG. 1, a tuner 11 receives a digital broadcast wave of a channel according to a channel designation signal supplied from a system control circuit 10. In this instance, the tuner 11 obtains an MPEG (Moving Picture Experts Group) signal by demodulating the received digital broadcast wave and supplies it as an MPEG signal M1 to each of a hard disk drive (HDD) 12 and a selector 13. When the channel designation signal which designates a channel of analog television broadcast (NTSC system, PAL system, or SECAM system) is supplied, the tuner 11 receives an analog television broadcast wave of the designated channel. In this process, the tuner 11 supplies a television signal obtained by demodulating the received analog television broadcast wave to an MPEG encoder 14. The MPEG encoder 14 supplies a signal obtained by performing an MPEG encoding process to the TV signal to the HDD 12 as an MPEG signal M2.

Figure 2:
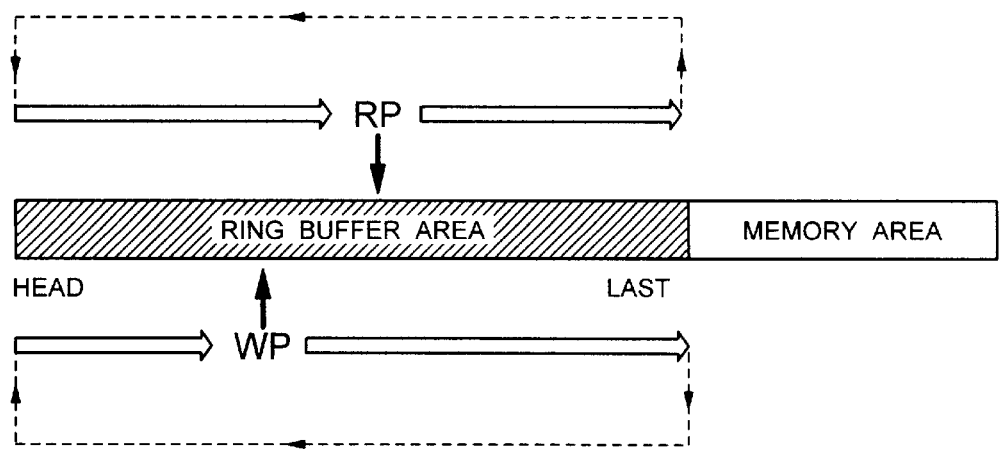
FIG. 2 is a diagram showing a ring buffer area and a memory area formed on a hard disk 120.

In response to a recording command signal supplied from the system control circuit 10, the HDD 12 records the MPEG signal M1 or M2 into a ring buffer area or a memory area on a hard disk 120 as shown in FIG. 2. In response to a reproducing command signal supplied from the system control circuit 10, the HDD 12 reads out and reproduces the MPEG signal recorded in the ring buffer area or memory area and supplies it as a reproduction MPEG signal RM to the selector 13. The broadcast program selected as a target of reproduction is not limited to the television broadcast, but a radio broadcast program having an audio sound information only can also be selected.

In the ring buffer area, the HDD 12 records and reproduces the MPEG signal in a format as shown in FIG. 2. A write position WP shown in FIG. 2 indicates a present recording position in the ring buffer area and a read position RP indicates a present reproducing position in the area. As indicated by blank arrows in the diagram, the WP and RP are independently and gradually moved from the head position to the last position of the ring buffer area. When they reach the last position, they return to the head position and move again toward the last position. That is, in the ring buffer area, the recording and reproduction of information are continuously and circulatively executed from the head position to the last position of the area. In the ring buffer area, as mentioned above, the information recording is always performed by overwriting. Therefore, programs recorded in the ring buffer area cannot be permanently stored. Programs recorded in the memory area, on the other hand are permanently stored until a program erasing command is issued. That is, the ring buffer area where the broadcast program is temporarily recorded and the memory area where the broadcast program can be permanently recorded exist on the hard disk 120.

Between the reproduction MPEG signal RM supplied from the HDD 12 and the MPEG signal M1 supplied from the tuner 11, the selector 13 alternatively selects the signal according to a selection signal supplied from the system control circuit 10 and supplies it to an MPEG decoder 17. The MPEG decoder 17 obtains a video signal by performing an MPEG decoding process to the MPEG signal supplied from the selector 13 and supplies it as a video signal $D_{AV}$ to a selector 18. An OSD (On Screen Display) image generating circuit 19 generates an image signal $D_C$ for displaying images corresponding to various menu image data supplied from the system control circuit 10 and supplies it to the selector 18. Between the video signal $D_{AV}$ and the image signal $D_C$, the selector 18 alternatively selects the signal according to the selection signal supplied from the system control circuit 10 and supplies it to a display device 200. The display device 200 displays an image based on the video signal $D_{AV}$ or the image signal $D_C$ supplied from the hard disk recorder 100.

Contents management information to manage the information contents recorded in the ring buffer area and the memory area on the hard disk 120 is stored in a recording contents management memory 30.

FIG. 3 is a diagram showing an example of the contents management information stored in the recording contents management memory 30.

As shown in FIG. 3, the contents management information comprises: a contents ID for identifying the information content; a title of the information content; a recording area address $AD_E$; a memory stop address $AD_{MS}$; a reproduction history flag $F_{RP}$; and a deletion flag $F_{DL}$. The recording area address $AD_E$ indicates a physical address on the hard disk 120 where the information content has been recorded. If one consecutive information content has been divided into a plurality of blocks when recorded onto the hard disk 120, the physical addresses each of which corresponds to each of the blocks will be described in the manner as depicted in some of the sections shown in FIG. 3. The memory stop address $AD_{MS}$ indicates are producing position on the hard disk 120 at an instant when a memory stop button MS of an operating device 20 is pressed, which will be explained later.

The reproduction history flag $F_{RP}$ indicates a reproduction history of the information content. For example, the reproduction history flag $F_{RP}$ of "0" is added to the information content when the information content has not been reproduced even once in the past, "1" is added when the information content has already been reproduced, and "2" is added when the information content is being reproduced.

The deletion flag $F_{DL}$ is a flag showing whether the user has deleted the information content or not. For example, the deletion flag $F_{DL}$ of "0" is added to the information content which is not deleted and "1" is added to the deleted contents.

As shown in FIG. 3, the contents management information corresponding to the information contents recorded in the ring buffer area and the contents management information corresponding to the information contents recorded in the memory area have been divided and stored in the recording contents management memory 30.

Figure 4:
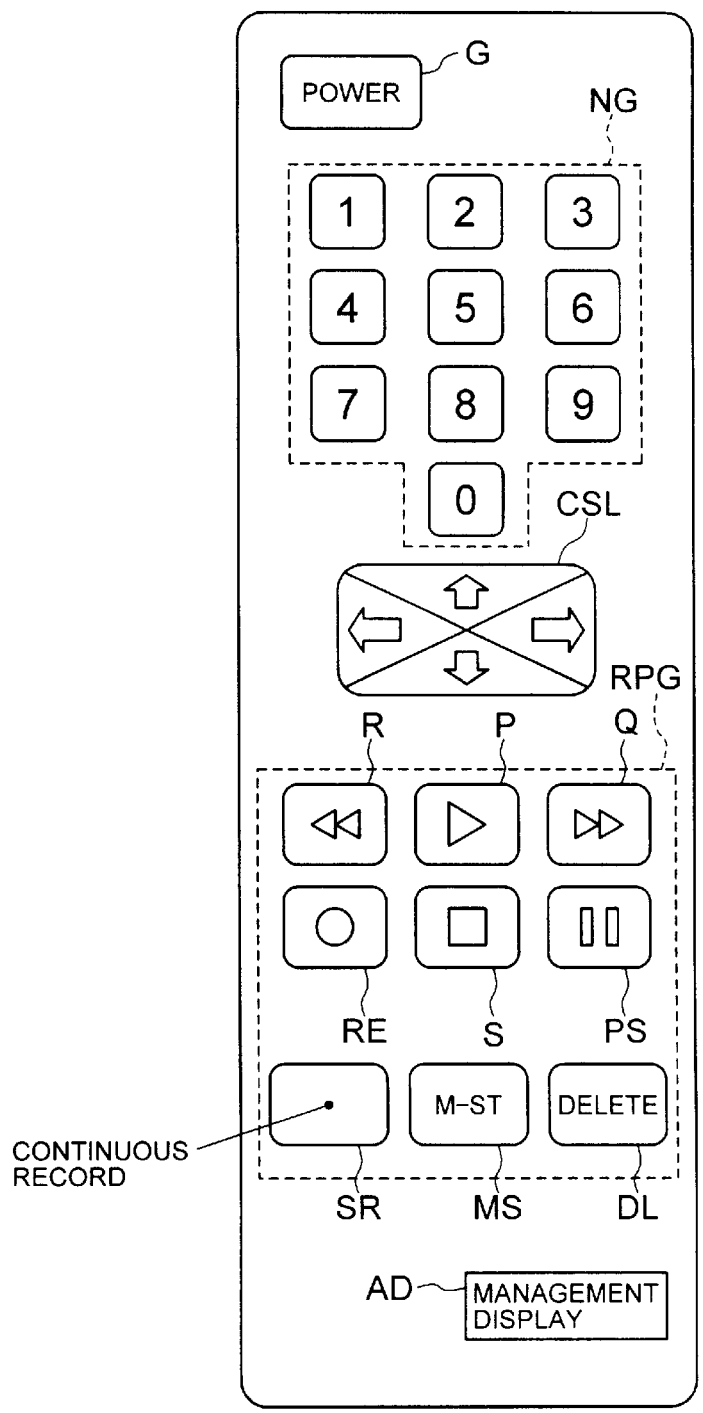
FIG. 4 is a diagram showing an example of an operation panel of an operating apparatus 20.

The operating device 20 is, for example, a remote controller having an operation panel as shown in FIG. 4. A power button G for turning on/off a power source of the hard disk recorder 100 and a numeral button group NG for designating a channel or entering various numerical values are provided for the operation panel. A play button P, a fast forward button Q, a rewind button R, a pause button PS, a stop button S, and a record button REC for various fundamental operations of the hard disk recorder 100 are provided for the operation panel. A cursor button CSL for moving a selection frame (which will be explained later) displayed on a screen of the display device 200 in the screen is provided for the operation panel. Further, a continuous record button SR, a memory stop button MS, a program delete button DL, and a management table display button AD are provided for the operation panel.

To stop the reproduction operation of the hard disk recorder 100, the user presses the stop button S or memory stop button MS. During the reproduction of a desired program, the reproducing operation is stopped and the operation is shifted to the reproduction of another program, and thereafter, if the user wants to reproduce the desired program again from the interrupted position, he presses the memory stop button MS.

When the various buttons provided for the operating apparatus 20 are pressed by the user, the operating apparatus 20 generates an operation signal corresponding to the pressed button and transmits it to the system control circuit 10 by using a short range radio interface such as infrared rays or Bluetooth.

The system control circuit 10 receives various operation signals transmitted from the operating apparatus 20 and executes a control to realize the operation according to the operation signal.

The various operations of the hard disk recorder 100 which are executed by the system control circuit 10, particularly, the television monitoring operation, continuous recording operation, program storing operation, and reproducing operation will be described hereinbelow.

(1) Television Monitoring Operation

When monitoring a live broadcast program, that is, a program which is being broadcast in real-time, the user designates a desired channel by pressing the numeral button group NG of the operating apparatus 20. In accordance with this operation, the operating apparatus 20 supplies a television monitor command signal to the system control circuit 10. In response to the TV monitor command signal, the system control circuit 10 supplies the channel designation signal indicative of the desired channel to the tuner 11. At the same time, the system control circuit 10 supplies a selection signal for alternatively transferring the MPEG signal M1 generated from the tuner 11 to the MPEG decoder 17 to the selector 13. The system control circuit 10 further supplies a selection signal for alternatively transferring the video signal $D_{AV}$ generated from the MPEG decoder 17 to the display device 200 to the selector 18. By the operation as mentioned above, the MPEG signal M1 obtained by receiving and demodulating by the tuner 11 is decoded into the video signal $D_{AV}$ by the MPEG decoder 17 and supplied to the display device 200. The display device 200, thus, displays an image of the digital broadcast program of the desired channel received by the tuner 11 in a real-time manner.

(2) Continuous Recording Operation

When continuously and successively recording each program broadcasted by the desired channel, the user presses the continuous record button SR on the operating apparatus 20. In accordance with the operation, the operating apparatus 20 supplies a continuous recording command signal to the system control circuit 10. In response to the continuous recording command signal, the system control circuit 10 supplies a ring buffer recording command signal to the HDD 12. In response to the ring buffer recording command signal, the HDD 12 records the MPEG signal M1 (or M2) obtained by receiving and demodulating by the tuner 11 into the ring buffer area on the hard disk 120 as shown in FIG. 2. That is, the HDD 12 successively records the MPEG signal M1 (or M2) into the ring buffer area from the head position to the last position of the ring buffer area. In this operation, after completion of the recording up to the last position of the ring buffer area, the HDD 12 returns the recording position to the head position and records the MPEG signal M1 (or M2) in the overwriting way from the head position again. When executing the recording into the ring buffer area, the system control circuit 10 determines the priority among the recording areas to be overwritten by referring to the reproduction history flag $F_{RP}$ in the contents management information stored in the recording contents management memory 30 as shown in FIG. 3. That is, when performing the overwriting of the signal, the system control circuit 10 sets the first priority to the area where the information content of which the reproduction history flag $F_{RP}$ is "reproduced" has been recorded. The system control circuit 10 sets the second priority to the area where the information content of which reproduction history flag $F_{RP}$ is "not-yet reproduced" has been recorded. The system control circuit 10 sets the third priority to the area where the information content whose reproduction history flag $F_{RP}$ is "halfway reproduction" has been recorded. The HDD 12, therefore, executes the overwrite-recording of the MPEG signal M1 (or M2) while searching the recording position in the ring buffer area based on the priority of overwriting as described above. By setting the priority in this way, the timing when the information content in a reproducing state is overwritten becomes latest, as compared with other information contents. This consequently increases a possibility that the reproduction from the position on the halfway of the reproduction can be executed.

According to the recording operation as mentioned above, only the programs broadcasted by the desired channel are continuously and successively recorded into the ring buffer area. In this process, the system control circuit 10 generates the contents management information regarding each of the programs recorded in the ring buffer area and sequentially stores it into the recording contents management memory 30. That is, the system control circuit 10 stores the title of the recorded program and the contents management information of which the physical address of the program on the hard disk 120 is set to the recording area address $AD_E$ into the recording contents management memory 30. Immediately after the recording, a memory stop address $AD_{MS}$ is initialized to "0000". Furthermore, "0" indicative of "not-yet viewed state" has been initially set as a reproduction history flag $F_{RP}$ and "0" indicative of "not-deleted" has been initially set as a deletion flag $F_{DL}$, respectively.

(3) Program Storing Operation

When recording the broadcast program currently received by the tuner 11 and storing it permanently, the user presses the record button REC of the operating apparatus 20 in the receiving state of the broadcast program as it is. In accordance with this operation, the operating apparatus 20 supplies a program storing command signal to the system control circuit 10. In response to the program storing command signal, the system control circuit 10 supplies a storage recording command signal for recording the MPEG signal M1 (or M2) obtained by the reception and demodulation at the tuner 11 into the memory area on the hard disk 120 as shown in FIG. 2 to the HDD 12. In this case, the system control circuit 10 generates the contents management information regarding each of the programs recorded in the memory area and sequentially stores it into the recording contents management memory 30. That is, the system control circuit 10 stores the title of the recorded program and the contents management information in which the physical address of the program on the hard disk 120 is set to the recording area address $AD_E$ into the recording contents management memory 30. Immediately after the recording, "0000" is set as an initial value of the memory stop address $AD_{MS}$. Furthermore, "0" indicative of "not-yet viewed state" is set as an initial value of the reproduction history flag $F_{RP}$ and "1" indicative of "not-deleted" is set as an initial value of the deletion flag $F_{DL}$.

(4) Reproduction Operation

When reproducing the desired program among the programs recorded on the hard disk 120 as mentioned above, the user first presses the management table display button AD of the operating apparatus 20. In response to this operation, the operating apparatus 20 transmits a management table display command to the system control circuit 10. In response to the management table display command, the system control circuit 10 generates management table image display data based on the contents management information stored in the recording contents management memory 30 and supplies it to the OSD image generating circuit 19. That is, the system control circuit 10 extracts the information representing the titles, reproduction history flag $F_{RP}$, deletion flag $F_{DL}$, and recording area segments (segments showing the ring buffer area or the memory area) of all of the recorded programs from the contents management information as shown in FIG. 3 and produces them as management table image display data. Based on the management table image display data, the OSD image generating circuit 19 generates the image signal $D_C$ for displaying a management table image as shown in FIG. 5 onto the display device 200 and supplies it to the selector 18. In this process, the system control circuit 10 supplies the selection signal for alternatively transferring the image signal $D_C$ generated from the OSD image generating circuit 19 to the display device 200 to the selector 18. By the series of operations mentioned above, the management table image as shown in FIG. 5 is displayed on the screen of the display device 200.

By operating the cursor button CSL provided on the operating apparatus 20, the user moves a selection frame SB displayed on the screen of the display device 200 as shown in FIG. 5 onto the title of the program selected as a reproduction target. Subsequently, the user presses the play button P. In accordance with the operation, the system control circuit 10 executes a control according to a reproducing operation start control routine as shown in FIG. 6.

Figure 6:
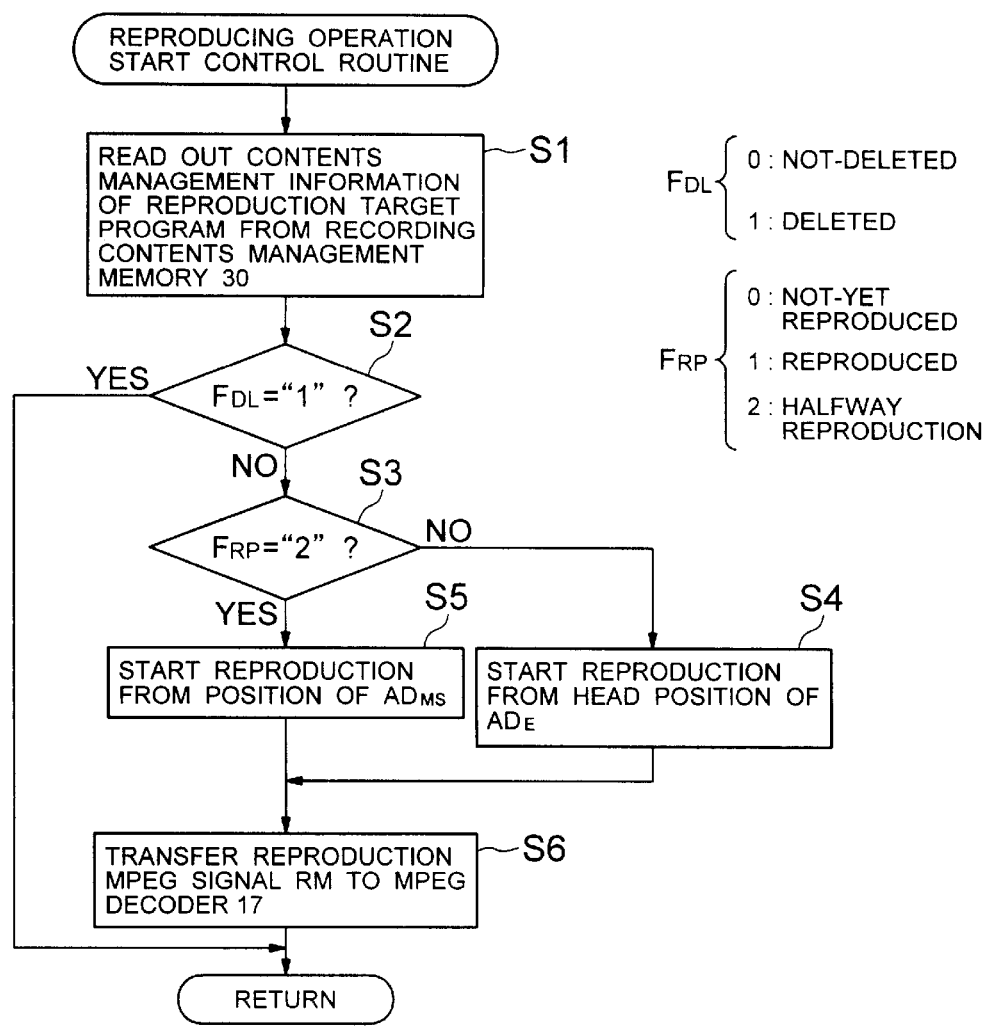
FIG. 6 is a diagram showing a reproducing operation start control routine.

In FIG. 6, first, the system control circuit 10 reads out the contents management information corresponding to the reproduction target program from the recording contents management memory 30 (step S1). Subsequently, the system control circuit 10 judges as to whether or not the deletion flag $F_{DL}$ (shown in FIG. 3) in the contents management information is "1" that indicates the deleting state (step S2). If it is determined in step S2 that the deletion flag $F_{DL}$ is not equal to "1" that indicates the deleting state, the system control circuit 10 subsequently judges as to whether or not the reproduction history flag $F_{RP}$ (shown in FIG. 3) in the contents management information is "2" that indicates "halfway reproduction" (step S3). In step S3, If it is determined that the reproduction history flag $F_{RP}$ is not "2" that represents "halfway reproduction", the system control circuit 10 extracts the recording area address $AD_E$ (shown in FIG. 3) from the contents management information and supplies a reproduction start command signal for successively starting the reproduction from the head position to the HDD 12 (step S4).

In step S3, If it is determined that the reproduction history flag $F_{RP}$ is equal to "2" indicating "halfway reproduction", the system control circuit 10 extracts the memory stop address $AD_{MS}$ (shown in FIG. 3) from the contents management information and supplies the reproduction start command signal for successively starting the reproduction from the position of this address to the HDD 12 (step S5).

After the execution of step S5 or S4, the system control circuit 10 supplies a selection signal for alternatively transferring the reproduction MPEG signal RM reproduced and generated from the HDD 12 to the MPEG decoder 17 to the selector 13 (step S6). The reproduction MPEG signal RM reproduced and generated from the HDD 12 is, thus, decoded into the video signal $D_{AV}$ by the MPEG decoder 17 and, thereafter, supplied to the display device 200.

If the reproduction history flag $F_{RP}$ corresponding to the reproduction target program does not indicate "halfway reproduction", therefore, by executing the processes in steps S3, S4, and S6, the reproduction is started from the head of the reproduction target program. If the reproduction history flag $F_{RP}$ indicates "halfway reproduction", by executing the processes in steps S3, S5, and S6, the program reproduction is started from the position of the memory stop address $AD_{MS}$ showing the position on the halfway of the reproduction.

After the execution of step S6 or if it is determined in step S2 that the deletion flag $F_{DL}$ is equal to "1" indicative of the deleting state, the system control circuit 10 exits from the reproducing operation start control routine and is returned to the execution of the main routine (not shown). That is, if the deletion flag $F_{DL}$ corresponding to the reproduction target program is equal to "1" indicative of the deleting state, the reproducing operation for the program is not executed.

Figure 7:
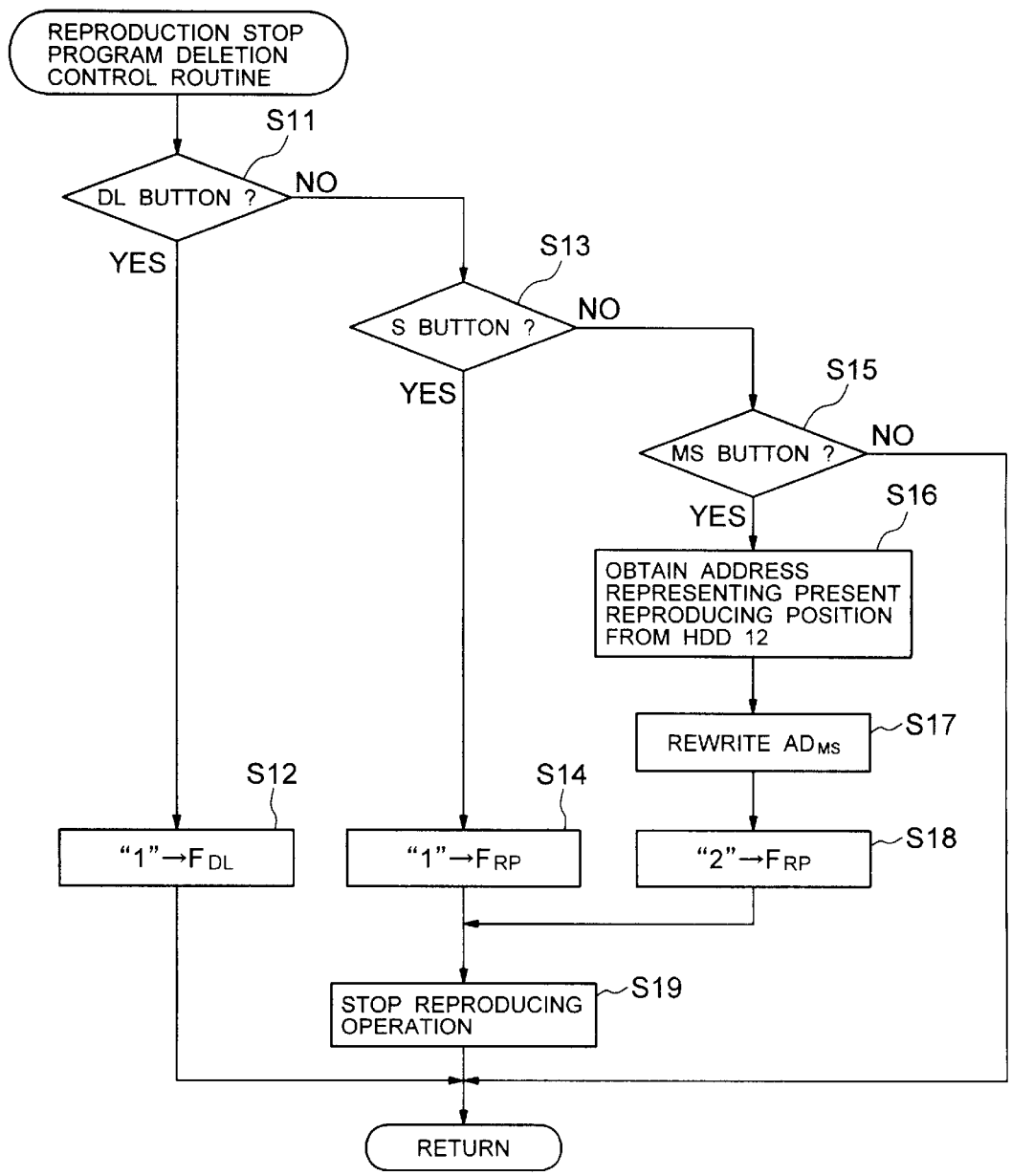
FIG. 7 is a diagram showing a reproduction stop/program deletion control routine.

During the reproducing operation as mentioned above, when the user presses one of the operation buttons provided on the operation panel as shown in FIG. 4, the system control circuit 10 executes a reproduction stop and program deletion control routine as shown in FIG. 7.

In FIG. 7, first, the system control circuit 10 discriminates whether the pressed button is the program delete button DL shown in FIG. 4 or not (step S11). If it is decided in step S11 that the program delete button DL has been pressed, the system control circuit 10 rewrites the deletion flag $F_{DL}$ (shown in FIG. 3) in the contents management information corresponding to the reproduction target program at the present point of time to "1" (step S12). After the execution of step S12, the system control circuit 10 exits from the reproduction stop and program deletion control routine and is returned to the execution of the main routine (not shown).

That is, when the user presses the program delete button DL during the reproducing operation of the program, the system control circuit 10 rewrites the deletion flag $F_{DL}$ corresponding to the program which is being reproduced to "1", thereby setting the program which is being reproduced into the deleting state.

If it is determined in step S11 that the pressed button is not the program delete button DL, the system control circuit 10 subsequently discriminates whether the pressed button is the stop button S as shown in FIG. 4 or not (step S13). If it is determined in step S13 that the pressed button is the stop button S, the system control circuit 10 rewrites the reproduction history flag $F_{RP}$ (shown in FIG. 3) in the contents management information corresponding to the reproduction target program at the present point of time to "1" indicative of "reproduced" (step S14).

If it is determined in step S13 that the pressed button is not the stop button S, the system control circuit 10 subsequently discriminates whether the pressed button is the memory stop button MS as shown in FIG. 4 or not (step S15). If it is determined in step S15 that the pressed button is the memory stop button MS, the system control circuit 10 fetches the address indicative of the reproducing position in the hard disk 120 at the present point of time from the HDD 12 (step S16). Subsequently, the system control circuit 10 rewrites the value of the memory stop address $AD_{MS}$ (shown in FIG. 3) in the contents management information corresponding to the program which is being reproduced at present by the fetched address (step S17). Subsequently, the system control circuit 10 rewrites the value of the reproduction history flag $F_{RP}$ (shown in FIG. 3) in the contents management information corresponding to the program which is being reproduced at present by the fetched address (step S17) to "2" indicating "halfway reproduction" (step S18). After the execution of step S18 or S14, the system control circuit 10 supplies a reproduction stop command signal for stopping the reproducing operation to the HDD 12 (step S19). By the execution of step S19, the HDD 12 stops the reproducing operation. After the execution of step S12 or S19 or if it is determined in step S15 that the pressed button is not the memory stop button MS, the system control circuit 10 exits from the reproduction stop and program deletion control routine and is returned to the execution of the main routine (not shown).

When the user presses the stop button S in order to stop the reproducing operation of the program which is being reproduced at present, therefore, the reproducing operation is stopped and the reproduction history flag $F_{RP}$ corresponding to the program is set to "1" showing "reproduced". When the reproducing operation start control routine shown in FIG. 6 is executed so as to reproduce the program at the next time, consequently, the reproduction is started from the head position of the program by steps S4 and S6. When the user presses the memory stop button MS, the reproducing operation is stopped and the reproduction stop position (address) on the hard disk 120 is stored as a memory stop address $AD_{MS}$ into the recording contents management memory 30. Further, the reproduction history flag $F_{RP}$ corresponding to the reproduced program is rewritten to "2" showing "halfway reproduction". When the reproducing operation start control routine shown in FIG. 6 is executed so as to reproduce the program at the next time, thus, by the execution of steps S5 and S6, the reproduction of the program is started from the position where the reproducing operation was stopped at the previous time.

According to the operations as mentioned above, during the reproduction of the program A, even if the reproducing operation of the program A is interrupted and the operation is shifted to the reproduction of another program B, the reproduction of the program A can be started from the reproduction interrupted position after that in response to a reproduction start command to the program A.

In the embodiment, the setting of the memory stop address $AD_{MS}$ and the reproduction history flag $F_{RP}$ as mentioned above is executed by pressing the memory stop button MS provided on the operating apparatus 20. The program which is being reproduced is deleted by pressing the delete button DL. The operation to execute both of the functions, however, can be also accepted without providing dedicated buttons such as memory stop button MS and delete button DL for the operating apparatus 20.

For example, when the user presses the stop button S provided on the operating apparatus 20 as shown in FIG. 4, the system control circuit 10 supplies image data to the OSD image generating circuit 19 in order to display a program reproduction option menu as shown in FIG. 8 onto the screen of the display device 200. Subsequently, the system control circuit 10 supplies the selection signal for alternatively transferring the image signal $D_C$ generated from the OSD image generating circuit 19 to the display device 200 to the selector 18. By the operations as mentioned above, the program reproduction option menu in which the following selection items 1 to 3 as shown in FIG. 8 are shown is displayed on the screen of the display device 200: that is, (1) "Reproduce from the interrupted position upon next reproduction", (2) "Reproduce from the head position upon next reproduction", and (3) "Delete the program".

When the user selects the selection item 1 on the program reproduction option menu by operating the cursor button CSL provided on the operating apparatus 20 as shown in FIG. 4 during the period of time, the system control circuit 10 executes a series of control in steps S16 to S19 as shown in FIG. 7. When the user selects the selection item 2 on the program reproduction option menu, the system control circuit 10 executes a series of control in steps S14 and S19 as shown in FIG. 7. When the user selects the selection item 3 on the program reproduction option menu, the system control circuit 10 executes step S12 as shown in FIG. 7.

That is, by selecting (by allowing the user to select) the desired item from the program reproduction option menu as shown in FIG. 8 in place of providing the memory stop button MS and the delete button DL for the operating apparatus 20, those functions are accepted.

In the embodiment of the invention as mentioned above, the reproduction history flag $F_{RP}$ that represents "halfway reproduction" is added in the case where the information content which is not reproduced once in the past is being reproduced. The memory stop address $AD_{MS}$ is added only to the information contents to which the reproduction history flag $F_{RP}$ that represents "halfway reproduction" has been added. Even for the information content which has already been reproduced, however, when the reproduction is interrupted again during the reproduction, the memory stop address $AD_{MS}$ can be also stored. With respect to all of the recorded information contents, consequently, the interruption address at the time of interruption of the reproduction can be managed, so that a convenience of the user can be further enhanced.

Although the reproduction history flag $F_{RP}$ has been added to all of the information contents stored in the ring buffer area and memory area in the embodiment, the reproduction history flag $F_{RP}$ can be also added only to the information contents stored in either the ring buffer area or the memory area.

As described in detail above, according to the invention, the reproduction history information which represents the reproduction history of the information content recorded on the recording medium is stored for each of the information contents.

According to the invention, even after reproduction of one information content A is interrupted and the reproduction operation is shifted to another information content B, the reproduction can be restarted from the position of the information content A at which the reproduction was interrupted, without the need of troublesome operations.

This application is based on a Japanese Patent Application No. 2000-397599 which is hereby incorporated by reference.

What is claimed is:

1. An apparatus for recording and reproducing information which can record a plurality of information contents onto a recording medium and reproduce the recorded information contents, comprising:

a reproduction history information generating part for generating reproduction history information representing a reproduction history of said information content recorded on said recording medium; and a management memory for storing said reproduction history information in correspondence to each of said information contents.

2. An apparatus according to claim 1, further comprising a recording and reproduction control part for performing a recording control and/or a reproduction control of said information content based on said reproduction history information stored in said management memory.

3. An apparatus according to claim 2, wherein said reproduction history information is information representing either of a not-yet reproduced history that said information content has not been reproduced, a reproduced state that said information content has been reproduced, or a reproducing state that said information content is halfway reproduced.

4. An apparatus according to claim 3, wherein when said information content is in said reproducing state, reproducing position information representing a position on the halfway of the reproduction on said recording medium is included in said reproduction history information.

5. An apparatus according to any one of claims 3 to 4, wherein when said reproduction history information corresponding to the information content serving as a reproduction target in each of said information contents recorded on said recording medium indicates said reproducing state, said recording and reproduction control part starts the reproduction from a position on said recording medium indicated by said reproducing position information corresponding to said information content serving as said reproduction target.

6. An apparatus according to any one of claims 3 to 4, wherein when said reproduction history information corresponding to the information content serving as a reproduction target in each of said information contents recorded on said recording medium indicates said not-yet reproduced history or said reproduced state, said recording and reproduction control part reproduces said information content serving as said reproduction target from a head position of said information content.

7. An apparatus according to any one of claims 3 to 4, wherein a ring buffer area is formed on said recording medium, in which said information content is recorded circulatively in an overwriting way, and when said information content is recorded into said ring buffer area in the overwriting way, said recording and reproduction control part selects an area where said information content of which said reproduction history information is set to said reproduced state has been recorded as a first overwriting target area, selects an area where said information content of which said reproduction history information is set to said not-yet reproduced history has been recorded as a second overwrite target area, and selects an area where said information content of which said reproduction history information is set to said reproducing state has been recorded as a third overwrite target area, respectively.

8. An apparatus according to claim 4, further comprising a stop control part for stopping the reproducing operation of said information content in accordance with a stop operation or a memory stop operation, and wherein said reproduction history information generating part sets information indicative of a reproduction stop position on said recording medium to said reproducing position information in accordance with said memory stop operation and stores said information into said management memory in correspondence to said information content serving as a stop target.

9. An apparatus according to claim 8, wherein said reproduction history information generating part rewrites said reproduction history information stored in said management memory in correspondence to said information content serving as said stop target in accordance with said stop operation to information indicative of the reproduced state and rewrites said reproduction history information stored in said management memory in correspondence to said information content serving as said stop target in accordance with said memory stop operation to information indicative of the reproducing state.

10. An apparatus according to claim 8, further comprising a remote control having a stop button to accept said stop operation and a memory stop button to accept said memory stop operation.

11. An apparatus according to claim 8, further comprising a menu image display part for displaying a menu image to accept said memory stop operation onto a screen of a display apparatus.

12. An information reproducing method of reproducing desired information content from a recording medium on which a plurality of information contents have been recorded, comprising:
    a reproduction history information generating step of generating reproduction history information representing a reproduction history with respect to each of said information contents recorded on said recording medium; and
    a reproduction control step of making a reproduction control of said information content based on said reproduction history information.

13. A method according to claim 12, wherein said reproduction history information is information representing a not-yet reproduced history in which said information content is not reproduced once, a reproduced state, or a reproducing state.

14. A method according to claim 13, wherein when said information content is in said reproducing state, reproducing position information representing a position on the halfway of the reproduction on said recording medium is included in said reproduction history information.

15. A method according to claim 14, wherein in said reproduction control step, in the case where said reproduction history information corresponding to the information content serving as a reproduction target in each of said information contents recorded on said recording medium indicates said reproducing state, the reproduction is started from a position on said recording medium indicated by said reproducing position information corresponding to said information content serving as said reproduction target.

16. A method according to any one of claims 13 to 14, wherein in said reproduction control step, in the case where said reproduction history information corresponding to the information content serving as a reproduction target in each of said information contents recorded on said recording medium indicates said not-yet reproduced history or said reproduced state, said information content serving as said reproduction target is reproduced from a head position of said information content.

17. A method according to any one of claims 13 to 14, wherein a ring buffer area in which said information contents is circulatively recorded in an overwriting way is formed on said recording medium, and
    said method further comprises a recording control step for recording new information content into said ring buffer area in a manner such that an area where said information content on which said reproduction history information is set to said reproduced state has been recorded is selected as a first overwrite-target area, an area where said information content of which said reproduction history information is set to said not-yet reproduced history has been recorded is selected as a second overwrite target area, and an area where said information content in which said reproduction history information is set to said reproducing state has been recorded is selected as a third overwrite target area, respectively.

18. A method according to claim 14, further comprising a stop control step of stopping the reproducing operation of said information content in accordance with a stop operation or a memory stop operation, and wherein in said reproduction history information generating step, information indicative of a reproduction stop position on said recording medium is set to said reproducing position information corresponding to said information content serving as a stop target in accordance with said memory stop operation.

19. A method according to claim 18, wherein in said reproduction history information generating step, said reproduction history information corresponding to said information content serving as said stop target is rewritten to information indicative of the reproduced state in accordance with said stop operation, and said reproduction history information corresponding to said information content serving as said stop target is rewritten to information indicative of the reproducing state in accordance with said memory stop operation.

20. An apparatus for recording and reproducing information contents to/from a recording medium, comprising:
    a stop control part for stopping the reproducing operation of said information content in accordance with a stop operation or a memory stop operation;
    a reproduction history information generating part for storing information indicative of a reproduced state into a management memory as reproduction history information in correspondence to said information content serving as a stop target in accordance with said stop operation, and storing information indicative of a reproducing state as said reproduction history information and information indicative of a reproduction stop position as reproducing position information into said management memory in accordance with said memory stop operation, respectively; and
    a reproduction control part for, when said reproduction history information corresponding to said information content serving as a reproduction target in each of said information contents recorded on said recording medium indicates said reproduced state, reproducing said information contents serving as said reproduction target from a head position of said information content, and when said reproduction history information indicates said reproducing state, starting the reproduction from a position on said recording medium indicated by said reproducing position information corresponding to said information content serving as said reproduction target.

21. An apparatus according to claim 20, further comprising a remote controller having a stop button to accept said stop operation and a memory stop button to accept said memory stop operation.

22. An apparatus according to claim 20, further comprising a menu image display part for displaying a menu image to accept said memory stop operation onto a screen of a display apparatus.

* * * * *